July 25, 1933.   W. E. GARITY   1,919,364
METHOD OF AND MEANS FOR SCORING MOTION PICTURES
Filed May 9, 1930
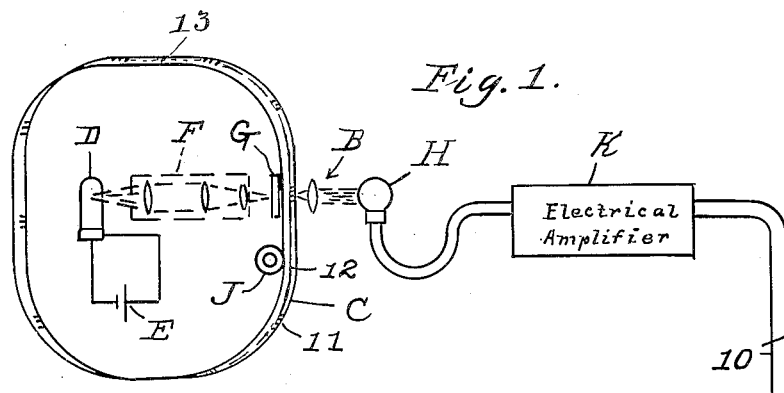
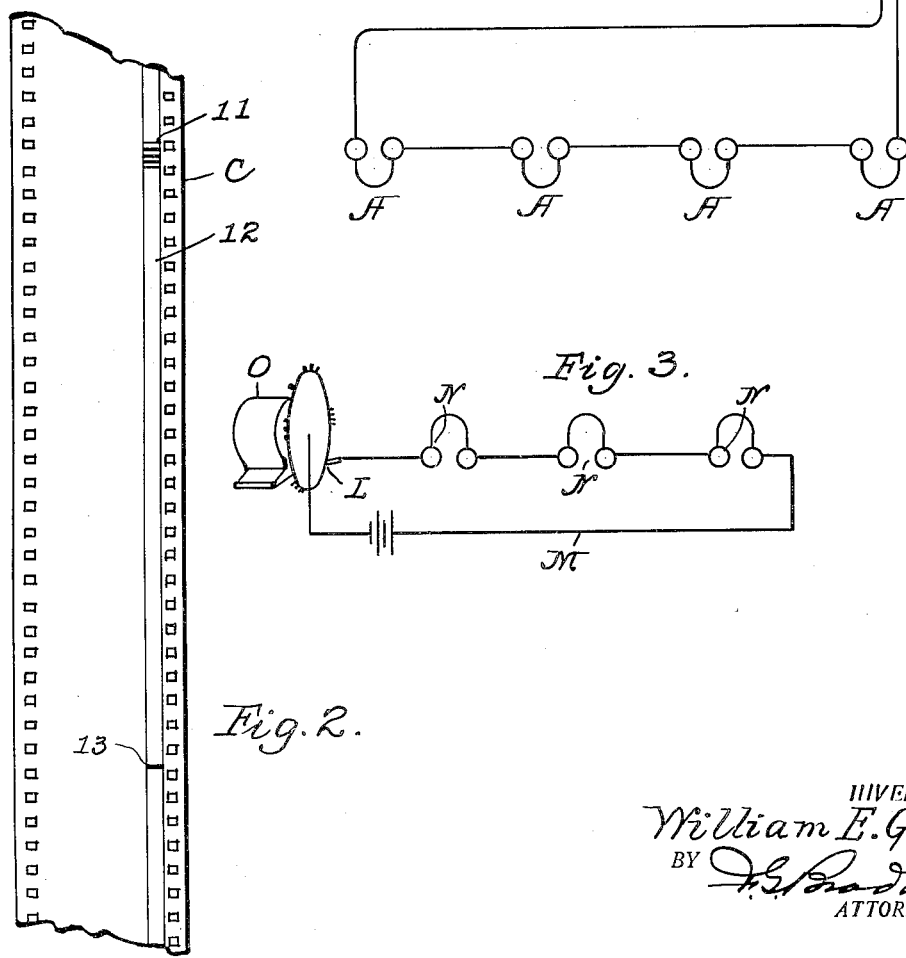
INVENTOR.
William E. Garity
BY
ATTORNEY.

Patented July 25, 1933

1,919,364

UNITED STATES PATENT OFFICE

WILLIAM E. GARITY, OF LOS ANGELES, CALIFORNIA, ASSIGNOR TO ROY O. DISNEY, OF LOS ANGELES, CALIFORNIA

METHOD OF AND MEANS FOR SCORING MOTION PICTURES

Application filed May 9, 1930. Serial No. 451,015.

My invention relates to an improved method of synchronizing sound with motion pictures, the primary object being to eliminate inaccuracy in scoring sound upon motion picture film. The usual method in practice has been to project the picture on a screen and produce the sound in the correct tempo, the synchronizer being the leader of an orchestra or director of any sound, upon whose careful eye and ear accuracy depends. In the companion application filed by Roy E. Disney, Oct. 16, 1928, Serial Number 312,783, has been set forth a method and means for accomplishing the result attained by the invention set forth in the present application only to a less degree of perfection and it is the primary object of this invention to simplify and improve upon the method and apparatus of said first invention.

In said co-pending application has been disclosed the use of a dancing ball which appears to move up and down in accordance with the rhythm or tempo of the musical score which had been previously prepared for the picture as the film progresses during the projection of a picture. On this score was included scores for effect or trap men, whose purpose was to put in the noises or effects other than music. This method enabled a close following of the score by the individual musicians, and enabled them to concentrate on the music and effects, and eliminated the necessity of their trying to follow the action of the picture. This system was operated satisfactorily but it was found that the small ball was a difficult object for the conductor to follow.

From this process evolved a second system which consisted of a wide line drawn horizontally across the picture, which had an undulating action up and down on the picture. The advantage of this system over the first described in said co-pending application was mainly in the facility with which the conductor could follow this waving band. Its use however proved rather cumbersome because of the fact that it was found almost impossible for the conductor to change the rythm during the progress of recording, due to the fact that the musicians were using unusual scores, and these required their entire attention.

From this last mentioned system has evolved the present method which in effect employs an electrical means, said means producing notes or a series of notes or beats, singly or in series. The beat is transmitted to the scoring room by means of wires and each musician, trap man and conductor is furnished with a head phone similar to those used by telephone operators. By this means the tempo that is used in conjunction with the picture to be scored is conveyed simultaneously to the entire orchestra. This tempo producing means runs synchronously with the recording camera, so that the net result is a perfectly synchronized score.

In describing in detail the use of my invention, reference is made to the accompanying drawing, in which Fig. 1 is a diagrammatic perspective view of an apparatus for producing my improved beat method of synchronizing motion pictures; Fig. 2 is a plan of a fragment of the "score film" used with the apparatus shown in Fig. 1, and Fig. 3 is a diagrammatic perspective view of an alternative construction of apparatus for producing the beat by which the picture and sound are synchronized.

In the apparatus employed for carrying my improved method into practice, I employ a plurality of telephone head sets A to which an audio beat producing apparatus B is connected by conductors 10, said beat producing apparatus being adapted to convey simultaneously by the head sets to the musicians, conductor, trap man or any other operator wearing the head sets in the scoring room, the rhythm or tempo of the musical or sound score which has been prepared for a picture. As shown in Figs. 1 and 2, a band of moving picture film C is employed upon which beat modulations 11 are recorded on the usual sound track 12. The audio beat producing means as shown is a standard sound projecting device, consisting of the exciting lamp D, battery E for energizing said lamp and causing the latter to create a path of light through the optical system F and focus the light on the band of film C. G is the usual aperture plate, H the photo electric cell, the output of which is amplified by the photo electric amplifier K, the output of this being connected to the telephone head sets A by conductors 10.

The band of film bearing the beat modulations 11 is moved continuously past the focusing light from the exciting lamp D by means of the driving sprocket J, the drive shaft of which is adapted to be connected with and revolved by driving means such as the recording camera or any other synchronously operated driving member not shown. This apparatus is adapted to produce the equivalent of a beat for use by musicians and others in recording sound upon motion pictures synchronously but it will be understood that the use of any electrical, mechanical or photo electric means is contemplated for producing the beat within the spirit of my invention. When desired a single modulation 13 in advance of the regular beat modulation 11 may give warning by a click to the musicians or other attendants using the ear phones A in anticipation of the beat. The signals imparted to the musicians in accordance with this invention are audible to them alone and are not picked up by the microphone leading to the sound recording apparatus, so that the time signals are not recorded although the musicians are governed thereby.

As shown in Fig. 3 the beat is produced by a make and break contact L in an electric circuit M, said beat being transmitted to the musicians and other attendants through the use of the head phones N and a drive motor O arranged to operate in synchronism with the moving picture film upon which the sound record is being made.

The advantages of this system are many. The musical conductor need only start the orchestra, and from that point in so far as timing is concerned, each musician in the orchestra is governed by the beats heard in his or her individual ear phone. These beats are very definite and pronounced and enable the musician, particularly the trap and end men, to anticipate effects and noises with sufficient accuracy so as to produce in the final result an amazing degree of accurate synchronization, even on the most complicated scores. By this system I have been able to successfully produce animated cartoons of cartoon characters playing the piano and violin, with such a degree of accuracy that the realism was preserved to as great an extent as is possible in this type of picture. This device can be successfully employed to produce talking pictures in cases where the original scenes were shot silently. In other words, it is possible to take an existing silent picture and by this method, apply voice to the picture and have a result which is far superior to that which would be obtained if the actors were permitted to speak while the film was being projected.

It is contemplated that this system is equally applicable to wax recording in which the records are made on wax discs or cylinders and wherein the beat can be produced from previously prepared wax records.

In accordance with the patent statutes, I have described the principles of operation of my invention together with the apparatus with which my invention can be carried into use but I desire to have it understood that the construction shown is only illustrative and that the invention can be carried into practice by other means and applied to uses other than those above set forth within the scope of the following claims.

Having described my invention, what I claim as new and desire to secure by Letters Patent is:

1. A method of producing accurately timed sound records for use with motion picture films, comprising aurally imparting time signals to a sound source without causing said signals to be audible to observers, said signals being timed in accordance with the normal speed of projection of the film for which the sound record is to be made, and recording sounds produced by said sound source in response to said signals.

2. In a method of producing accurately synchronized sound records for use with motion picture films, the steps of aurally and restrictively imparting time signals to a musician, said signals being timed to the action in a motion picture film and the normal speed of projection of said film, and recording sounds produced by the musician in response to said signals without recording said time signals with said sounds.

3. In a method of scoring motion pictures for the production of a musical record synchronized with a motion picture film, the steps of reproducing a motion picture film bearing only a beat or tempo record at a speed synchronous with the speed of projection of the motion picture film to be scored, electrically and restrictively transmitting the reproduced beats or tempo to the aural organs of individual musicians, whereby said beats are not rendered audible to others and making a record of music played by musicians in accordance with said transmitted tempo whereby the resulting record of said music is synchronized with the speed of projection and the tempo, but does not contain the sound of the original beat or tempo.

WILLIAM E. GARITY.